United States Patent
Tobita et al.

(10) Patent No.: US 8,068,678 B2
(45) Date of Patent: Nov. 29, 2011

(54) ELECTRONIC APPARATUS AND IMAGE PROCESSING METHOD

(75) Inventors: Yoshikata Tobita, Fuchu (JP); Yuki Kaneko, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 46 days.

(21) Appl. No.: 12/781,672

(22) Filed: May 17, 2010

(65) Prior Publication Data

US 2011/0052086 A1    Mar. 3, 2011

(30) Foreign Application Priority Data

Aug. 31, 2009  (JP) ................................. 2009-201036

(51) Int. Cl.
*G06K 9/62* (2006.01)
(52) U.S. Cl. .................... 382/224; 382/225; 382/228
(58) Field of Classification Search .............. 382/224, 382/225, 228
See application file for complete search history.

(56) References Cited

U.S. PATENT DOCUMENTS

| | | | |
|---|---|---|---|
| 6,606,411 B1 * | 8/2003 | Loui et al. ..................... 382/224 |
| 2002/0039203 A1 | 4/2002 | Endo et al. | |
| 2005/0286806 A1 | 12/2005 | Kayahara | |

FOREIGN PATENT DOCUMENTS

| | | |
|---|---|---|
| JP | 2000-276484 | 10/2000 |
| JP | 2002-191015 | 7/2002 |
| JP | 2002-342743 | 11/2002 |
| JP | 2002-358316 | 12/2002 |
| JP | 2003-199028 | 7/2003 |
| JP | 2005-196529 | 7/2005 |
| JP | 2006-048633 | 2/2006 |
| JP | 2006-048711 | 2/2006 |
| JP | 2006-050469 | 2/2006 |
| JP | 2006-146755 | 6/2006 |
| JP | 2007-019988 | 1/2007 |
| JP | 2007-304862 | 11/2007 |
| JP | 2008-131330 | 6/2008 |
| JP | 2008-165701 | 7/2008 |

OTHER PUBLICATIONS

Japanese Patent Application No. 2009-201036; Notice of Reasons for Rejection; Mailed Aug. 10, 2010 (English translation).

* cited by examiner

*Primary Examiner* — Anand Bhatnagar
*Assistant Examiner* — Michael Vanchy, Jr.
(74) *Attorney, Agent, or Firm* — Blakely, Sokoloff, Taylor & Zafman LLP

(57) ABSTRACT

According to one embodiment, an electronic apparatus includes a grouping module, an attribute determination module, a grouping attribute setting module, a group selection module, and a video generating module. The grouping module classifies contents, to which time information is added, into groups based on the time information. The attribute determination module determines attributes of each of the contents by analyzing features of the contents. The grouping attribute setting module sets, with respect to each of the groups, selected attributes as grouping attributes for the group, the selected attributes being selected from the attributes of the contents in the group under a predetermined condition. The group selection module selects, from the groups, at least one group for which the grouping attribute agreeing with or relating to an input search key are set. The video generating module generates video data by using the contents in the selected groups.

14 Claims, 11 Drawing Sheets

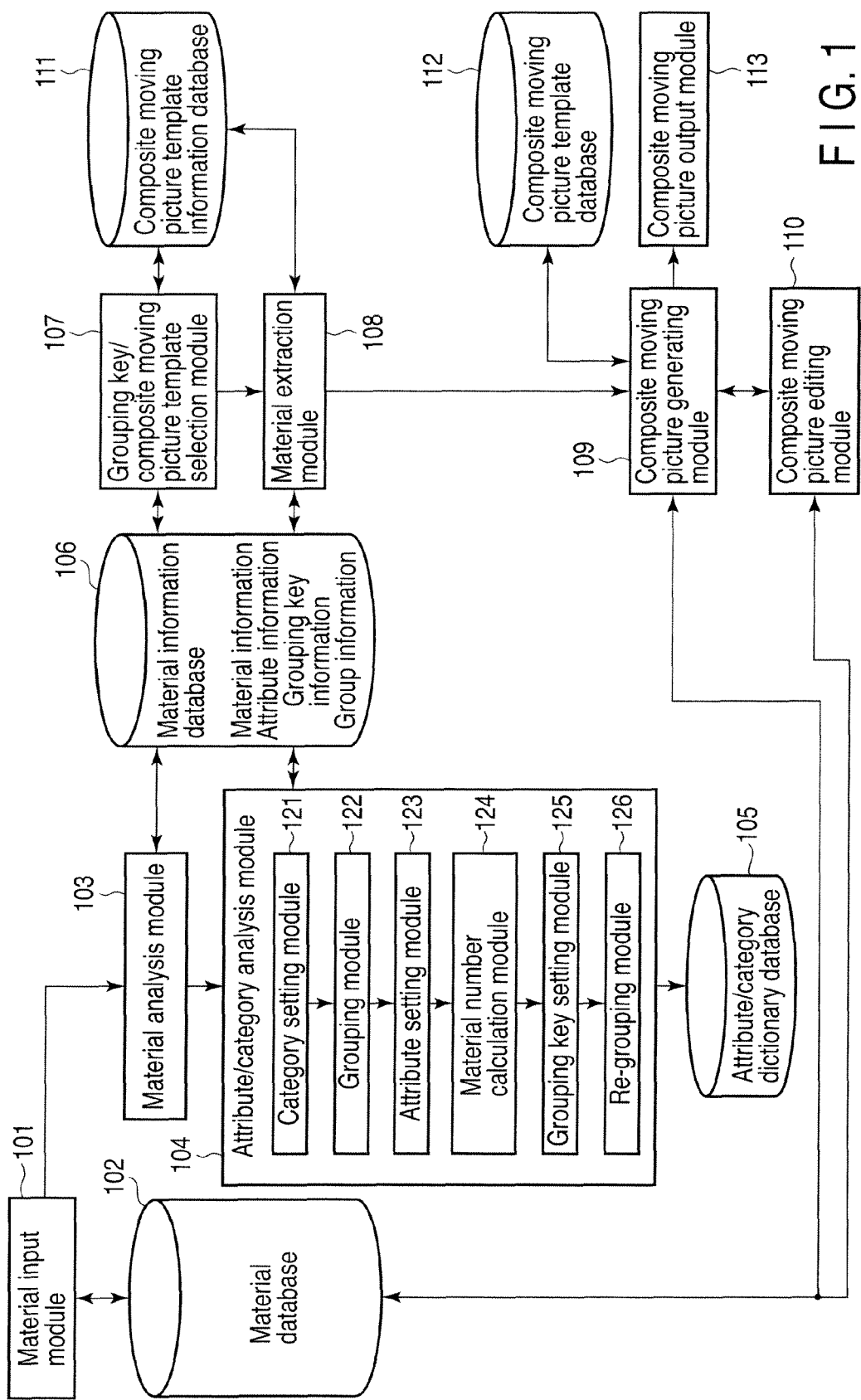
F I G. 1

| Material ID | File name | File path | File size | Generation time | Attribute 1 | ... | Initial group ID | Generation interval | Group ID |
|---|---|---|---|---|---|---|---|---|---|
| 000 | ... | ... | ... | ... | ... | ... | ... | ... | ... |
| 001 | ... | ... | ... | ... | ... | ... | ... | ... | ... |
| ... | ... | ... | ... | ... | ... | ... | ... | ... | ... |

FIG. 2

| Attribute ID | Attribute | Category | Total material number | Earliest material generation time | Latest material generation time | ... | ... | ... |
|---|---|---|---|---|---|---|---|---|
| 000 | ... | ... | ... | ... | ... | ... | ... | ... |
| 001 | ... | ... | ... | ... | ... | ... | ... | ... |
| ... | ... | ... | ... | ... | ... | ... | ... | ... |

FIG. 3

| ID | Category | Attribute |
|---|---|---|
| 000 | ... | ... |
| 001 | ... | ... |
| ... | ... | ... |

FIG. 4

| ID | Grouping attribute |
|---|---|
| 000 | ... |
| 001 | ... |
| ... | ... |

F I G. 5

| ID | Grouping category |
|---|---|
| 000 | ... |
| 001 | ... |
| ... | ... |

F I G. 6

| Group ID | Grouping attribute 1 | Grouping attribute 2 | ... | Grouping category 1 | Grouping category 2 | ... |
|---|---|---|---|---|---|---|
| 000 | ... | ... | ... | ... | ... | ... |
| 001 | ... | ... | ... | ... | ... | ... |
| ... | ... | ... | ... | ... | ... | ... |

F I G. 7

| Attribute (name of appearing person) | Number of occurrences (number of materials) by individual material analysis | Number of occurrences (number of materials) by group analysis |
|---|---|---|
| A | 6 | 8 |
| B | 5 | 8+4+5=17 |
| C | 9 | 8+3=11 |
| D | 2 | 3 |
| E | 7 | 4+5=9 |
| F | 7 | 4+5=9 |

In individual material analysis, it is difficult to determine which of attributes has high sensibility worth.

Attribute with high sensibility worth is extracted by group analysis.

F I G. 9

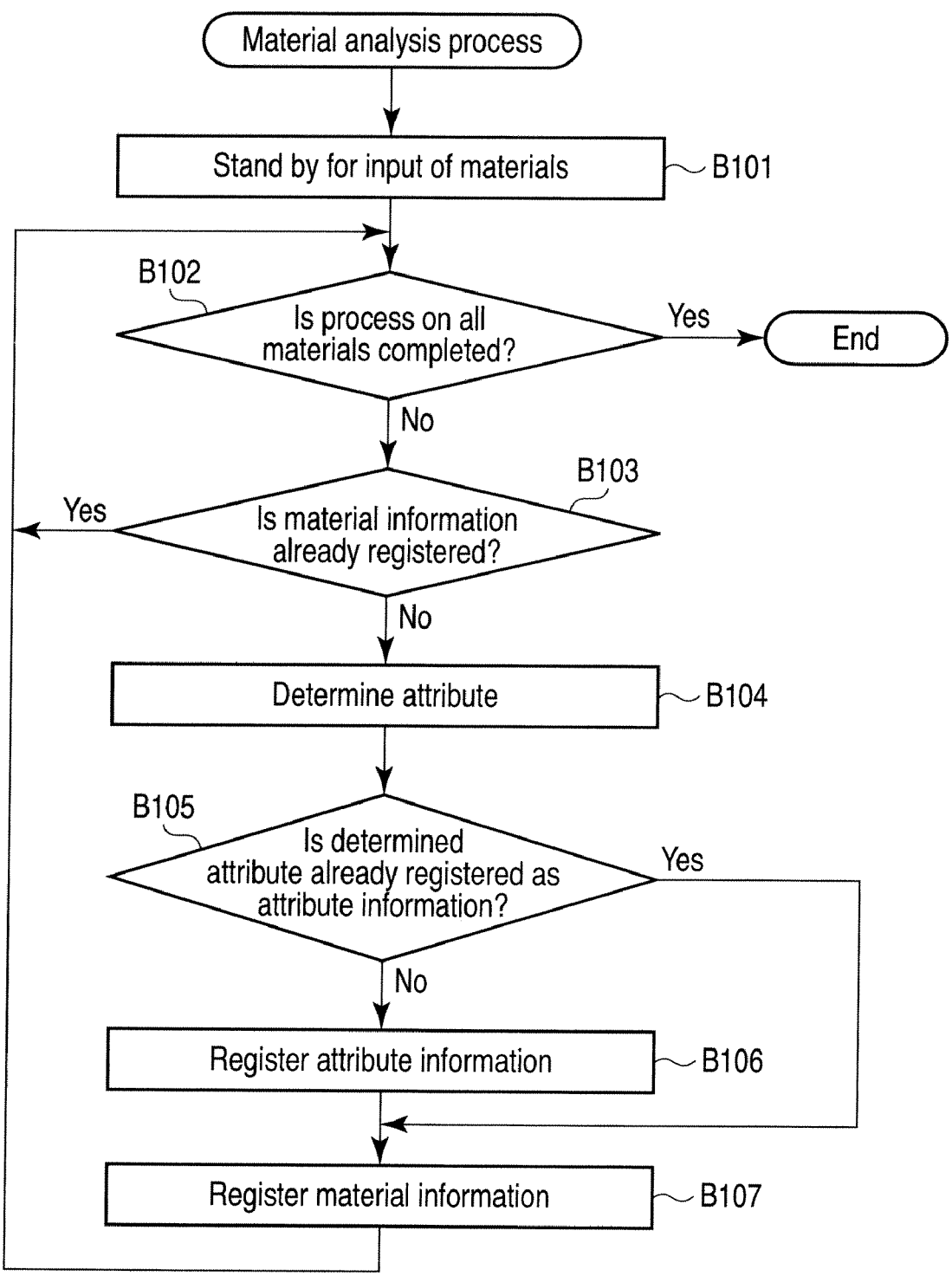
F I G. 10

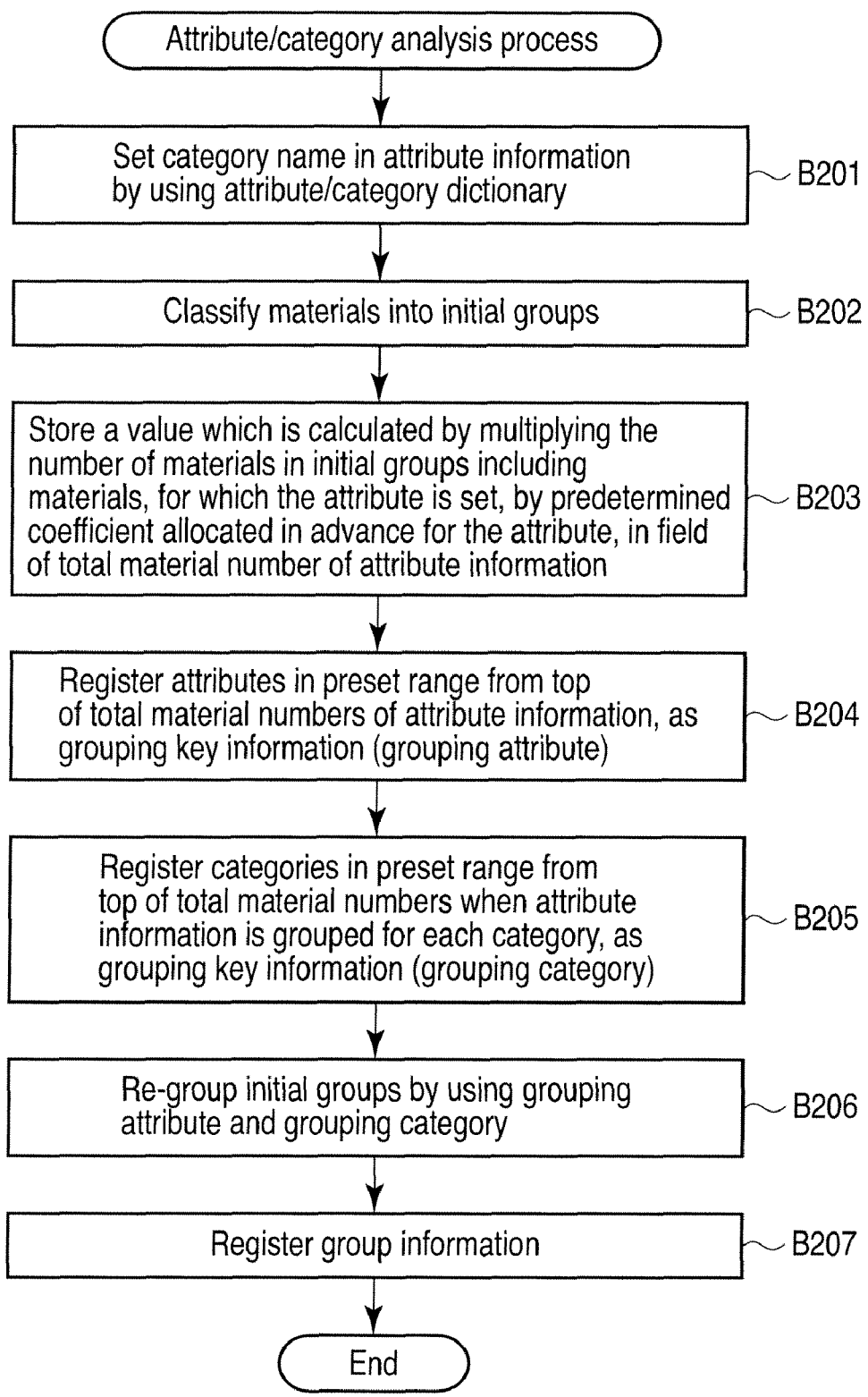
F I G. 11

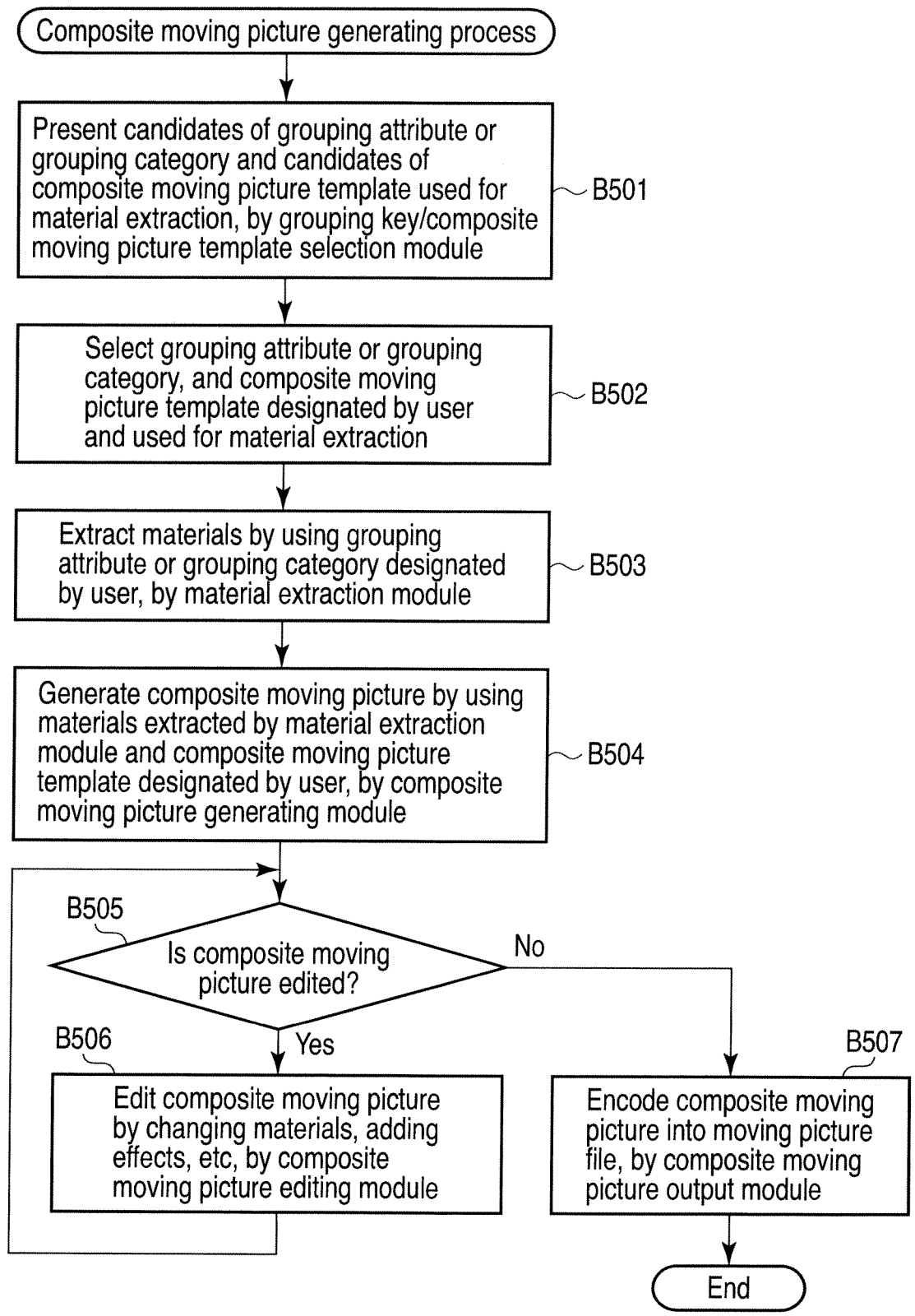
F I G. 14

ELECTRONIC APPARATUS AND IMAGE PROCESSING METHOD

CROSS-REFERENCE TO RELATED APPLICATIONS

This application is based upon and claims the benefit of priority from Japanese Patent Application No. 2009-201036, filed Aug. 31, 2009; the entire contents of which are incorporated herein by reference.

FIELD

Embodiments described herein relate generally to an electronic apparatus which assists in editing of accumulated contents, and to an image processing method applied to the electronic apparatus.

BACKGROUND

In recent years, it is usual that ordinary users collect and accumulate a great deal of contents. This is in part because there have been an increasing number of opportunities for users to take photos or video, with the prevalence of digital cameras, digital video cameras and camera-equipped mobile phones. In addition, contents are collected and accumulated by recording various video content data, such as television broadcast program data, with use of DVD recorders, hard disk recorders or personal computers, and by storing data, such as still images, moving pictures and audio, which are provided on Web sites of the Internet, in storage devices such as hard disks.

Various search methods have been proposed as methods for searching accumulated contents for necessary data. Jpn. Pat. Appln. KOKAI Publication No. 2000-276484 discloses an image search apparatus which can search for an image in an image database. This image search apparatus can search for images by taking into account the time, as well as image feature amounts, by grouping images which have been generated or modified at mutually close time points. In addition, Jpn. Pat. Appln. KOKAI Publication No. 2006-48711 discloses an image search system which generates an image, in which extracted images are laid out, by taking the degree of attention into account. This image search system can search for images by using, as search keys, the size of image, the grouping attribute and the degree of attention, and can generate an image in which the searched images are laid out based on the degree of attention.

In the image search apparatus of KOKAI Publication No. 2000-276484, images are searched for by using characteristics which can objectively be detected from each image, for instance, the date/time of capturing images, image features, and persons and objects appearing on images. Similarly, in the image search system of KOKAI Publication No. 2006-48711, images are searched for by using of objective characteristics of images, such as grouping attributes based on the size of image, the image features and a person or object appearing on images, and the objective degree of attention of images.

However, if contents (images, etc.), which are the objects of search, are collected by a specific user, it is highly possible that the contents are a set of contents which are collected by some intent based on the subjective view of the user. Thus, if such contents, which are collected by a specific user, to be searched for, it is possible that contents, which are suited to the subjective view or intent of the user, cannot be searched for by the search based on the objective characteristic.

For example, if the user searches for contents by using an arbitrary person as a search key, it is not difficult to retrieve a photo in which the person is clearly captured, by executing a face image recognition process on the contents. However, it is difficult to search for contents relating to the person, for example, a photo in which the person appears in a small size, a photo of a scene relating to the person, a photo of another person relating to this person, or a photo of an object relating to this person. Although there arises no problem if only face photos of the person who is used as the search key are to be retrieved, it is possible, for example, that a monotonous album or slide show, in which only face photos are displayed, may be generated using photos extracted by such retrieval.

BRIEF DESCRIPTION OF THE DRAWINGS

FIG. 1 is an exemplary block diagram showing the structure of an electronic apparatus according to a first embodiment of the present invention;

FIG. 2 shows an example of material information in a material information database which is provided in the electronic apparatus of the embodiment;

FIG. 3 shows an example of attribute information in the material information database provided in the electronic apparatus of the embodiment;

FIG. 4 shows an example of attribute/category dictionary data in an attribute/category dictionary database which is provided in the electronic apparatus of the embodiment;

FIG. 5 shows an example of grouping key information in the material information database provided in the electronic apparatus of the embodiment;

FIG. 6 shows another example of the grouping key information in the material information database provided in the electronic apparatus of the embodiment;

FIG. 7 shows an example of group information in the material information database provided in the electronic apparatus of the embodiment;

FIG. 9 is an exemplary view for explaining an example of a method of determining the grouping attribute shown in FIG. 8;

FIG. 10 is an exemplary flowchart showing an example of the procedure of a material analysis process by the electronic apparatus of the embodiment;

FIG. 11 is an exemplary flowchart showing an example of the procedure of an attribute/category analysis process by the electronic apparatus of the embodiment;

FIG. 14 is an exemplary flowchart showing an example of the procedure of a composite moving picture generating process by the electronic apparatus of the embodiment;

DETAILED DESCRIPTION

Figure 8:
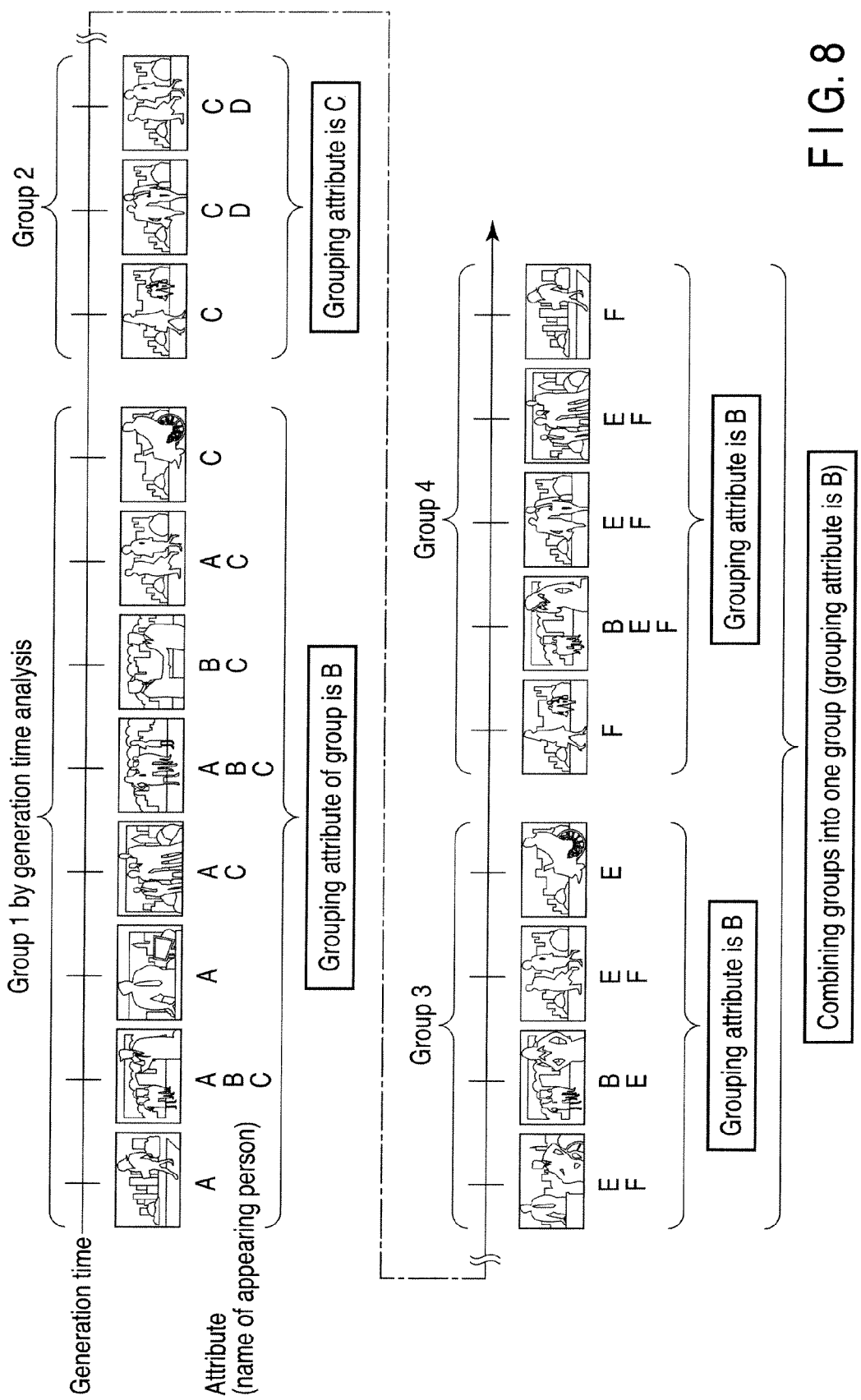
FIG. 8 is an exemplary view for explaining an example of grouping of materials and setting of grouping attributes by the electronic apparatus of the embodiment.

In general, according to one embodiment, there is provided an electronic apparatus comprising: a grouping module configured to classify contents, to which time information is added, into groups based on the time information; an attribute determination module configured to determine attributes of each of the contents by analyzing features of the contents; a grouping attribute setting module configured to set, with respect to each of the groups, selected attributes as grouping attributes for the group, the selected attributes being selected from the attributes of the contents in the group under a predetermined condition; a group selection module configured to select, from the groups, groups for which the grouping attribute agreeing with or relating to an input search key is set; and a video generating module configured to generate video data by using the contents in the selected groups.

To begin with, referring to FIG. 1, the structure of an electronic apparatus according to a first embodiment of the present invention is described. This electronic apparatus can be implemented, for example, as a personal computer or an embedded system in an electronic apparatus.

This electronic apparatus comprises a material input module 101, a material database 102, a material analysis module 103, an attribute/category analysis module 104, an attribute/category dictionary database 105, a material information database 106, a grouping key/composite moving picture template selection module 107, a material extraction module 108, a composite moving picture generating module 109, a composite moving picture editing module 110, a composite moving picture template information database 111, a composite moving picture template database 112, and a composite moving picture output module 113.

A description is first given of a method in which the respective components in the electronic apparatus construct the material database 102 and material information database 106 by using input materials (contents).

The material input module 101 stores input materials in the material database 102, in response to the input of materials. In addition, the material input module 101 outputs the input materials to the material analysis module 103.

The material database 102 is a database for storing materials (contents). The materials which are stored in the material database 102 are, for instance, contents, such as moving pictures, still images and audio, which are generated or collected by a user. Specifically, the material database 102 stores, as materials, photos and video which are taken by using digital cameras, digital video cameras and camera-equipped mobile phones, various video content data, such as television broadcast program data, which are recorded by using DVD recorders, hard disk recorders and personal computers, and still images, moving pictures and audio which are provided on Web sites of the Internet. In the description below, the term "material" and the term "content" are used in the same sense.

The material analysis module 103 analyzes the features of each of the materials which are output from the material input module 101, and determines attributes of each material. The material analysis module 103 stores in the material information database 106 the information relating to each material and the information indicative of the determined attributes of each material. The material analysis module 103 outputs the information relating to each material and the information indicative of the determined attributes of each material, to the attribute/category analysis module 104. In the meantime, the material analysis module 103 may inform the attribute/category analysis module 104 that materials have been input, and the attribute/category analysis module 104 may acquire the information relating to each material and the information indicative of the determined attributes of each material by referring to the material information database 106.

The material information database 106 is a database which stores material information, attribute information, grouping key information, and group information. The material analysis module 103 generates (updates) the material information and attribute information in the material information database 106.

FIG. 2 shows an example of material information in the material information database 106. The material information is generated for each of materials (contents). The material information includes a material ID, a file name, a file path, a file size, a generation time, attributes, an initial group ID, a generation interval, and a group ID.

The material ID is indicative of an ID which is set for each of materials.

The file name is indicative of the name of a file corresponding to a material. The file path is indicative of a location of storage of a file. The file size is indicative of a data size of a file. The generation time is indicative of a time when a file is generated (e.g. the date/time when a photo is taken). In the meantime, the generation time may be a time when a file is edited or a file is input (stored) to the electronic apparatus.

The attribute is indicative of the property which a material has. In other words, the content of the material is represented by the attribute. The attribute is indicative of, for example, identification information of a person included in a material; information of the number of persons detected; information of the degree of smile of a person; atmosphere information which is determined by the information of the number of persons detected (e.g. a photo with a large number of persons is "lively"); atmosphere information which is determined by the information of the degree of smile of a person (e.g. a photo with a high degree of smile is "happy", a photo with a low degree of smile is "serious"); identification information of an object; the number of objects detected; image feature information (e.g. hue); geographic information; a keyword; etc. A plurality of attributes may be set for a single material.

The initial group ID is indicative of the ID of an initial group to which a material belongs, which is determined by grouping based on the generation time of the material. For example, the grouping is implemented by clustering based on the generation times of materials. The generation interval is indicative of a difference between the generation times of materials neighboring in the time sequence, which is based on the generation times of materials. Thus, the generation interval is indicative of, for example, a difference between the generation time of a first material and the generation time of a second material succeeding the first material. In the above-described grouping, for example, materials are grouped into initial groups based on the generation interval, and the initial group ID of the initial group, to which each material belongs, is determined. An example of the procedure of the grouping will be described later, with reference to FIG. 8 and FIG. 12.

The group ID is indicative of an ID of a group which is determined by re-grouping for combining those of the initial groups, which meet a predetermined condition. In the re-grouping, for example, if grouping attributes, which are set for initial groups neighboring in a time sequence based on generation times, agree, these neighboring initial groups are combined. The grouping attribute is at least one attribute representing a group, which are selected from attributes that are set for materials belonging to this group. An example of the procedure of re-grouping will be described later with reference to FIG. 8 and FIG. 13.

FIG. 3 shows an example of attribute information which is stored in the material information database 106. The attribute information is generated for each of attributes. The attribute information includes an attribute ID, an attribute, a category, a total material number, an earliest material generation time, and a latest material generation time.

The attribute ID is indicative of an ID set for each attribute. The attribute is indicative of an attribute corresponding to the attribute ID. The category is indicative of a category corresponding to the attribute. The total material number is indicative of the sum of numbers of materials ("material numbers") belonging to groups for which each of attributes of materials is set. For example, if a material A having the attribute ID "000" belongs to group 1 and a material B having the attribute ID "000" belongs to group 2, the sum ($N_1+N_2$) of a material number $N_1$ of group 1 and a material number $N_2$ of group 2 is set as the total material number.

The earliest material generation time is indicative of a generation time of the earliest generated material of all materials for which each of the attributes is set. The latest material generation time is indicative of a generation time of the latest generated material of all materials for which each of the attributes is set.

The material analysis module 103 generates material information including a material ID, a file name, a file path, a generation time, and attributes, if material information corresponding to an input material is not stored in the material information database 106.

The material analysis module 103 generates attribute information including an attribute ID, an attribute, an earliest material generation time, and a latest material generation time, if attribute information corresponding to the attribute set for an input material is not stored in the material information database 106. If the attribute information is already stored in the material information database 106, the material analysis module 103 updates, where necessary, the earliest material generation time and latest material generation time of this attribute information.

The attribute/category analysis module 104 updates the material information and attribute information based on the analysis result of the material by the material analysis module 103, and then generates grouping key information and group information. The attribute/category analysis module 104 comprises a category setting module 121, a grouping module 122, an attribute setting module 123, a material number calculation module 124, a grouping key setting module 125, and a re-grouping module 126.

The category setting module 121 determines a category relating to attribute information by referring to the attribute/category dictionary database 105, and sets the determined category for the attribute information. The attribute/category dictionary database 105 is a database in which attribute/category dictionary data indicative of the correspondence between an attribute and a category is stored. FIG. 4 shows an example of the attribute/category dictionary data. The attribute/category dictionary data includes an ID, a category and an attribute. Thus, the category setting module 121 determines a category which is set for attribute information, by referring to the attribute/category dictionary database 105 by using the attribute as a key. One category may correspond to a plurality of attributes. For example, a category "family" corresponds to a plurality of personal names. In addition, one attribute may correspond to a plurality of categories. For example, one personal name corresponds to a category "children" and a category "family".

The grouping module 122 classifies input materials into initial groups based on generation times. The grouping module 122 sets the IDs, which are allocated to these initial groups, as initial group IDs of material information corresponding to materials belonging to the respective initial groups.

Specifically, the grouping module 122 calculates a generation interval which is indicative of a difference between generation times of materials neighboring in a time sequence based on generation times. The grouping module 122 classifies input materials into a plurality of initial groups by clustering based on the calculated generation interval. The grouping module 122, for example, determines the time interval which is allocated to one initial group based on the generation interval of each material. The grouping module 122 divides input materials into a plurality of initial groups by setting the determined time interval as a segmentation range. For example, the grouping module 122 classifies materials into a plurality of initial groups by dividing input materials at every determined time interval, with the beginning point being set at the material having the latest generation time. The grouping module 122 sets the ID, which is allocated to each of the plural initial groups, as the initial group ID of material information corresponding to materials in each initial group.

The attribute setting module 123 sets attributes and categories of materials in each of a plurality of initial groups. Specifically, the attribute setting module 123 can set a plurality of attributes and a plurality of categories for each of initial groups.

The material number calculation module 124 calculates, with respect to each of the attributes which are set for the input materials, the sum of numbers of materials in initial groups including at least one material having the attribute. The material number calculation module 124 sets the calculated sum of material numbers as the total material number of the attribute information. In the meantime, the value set for the total material number may be a value obtained by multiplying the calculated sum of material numbers by a predetermined coefficient for each attribute. The material number calculation module 124 may calculate, aside from the sum of material numbers, a value based on statistical information of each of the groups or each of the attributes. The material number calculation module 124 may calculate, for example, the frequency of occurrence, the standard deviation, etc. of a specific attribute in a specific initial group, as the value based on statistical information of each of the groups or each of the attributes.

The grouping key setting module 125 selects, with respect to each of the initial groups, an attribute with the largest calculated sum. The grouping key setting module 125 sets the selected attribute as the grouping attribute for this group.

In addition, the grouping key setting module 125 counts the total material number of each category, based on the total material number of each attribute set by the material number calculation module 124. With respect to each of the initial groups, the grouping key setting module 125 selects a category with the largest counted total material number of all categories corresponding to the materials in this group. The grouping key setting module 125 sets the selected category as the grouping category for this group.

The attribute, which is selected for the grouping attribute, is not limited to the attribute with the largest total material number, and may be an attribute with a total material number which is equal to or greater than a threshold, or an attribute in a preset range from the top in a descending order of total material numbers. The grouping key setting module 125 may calculate a difference between the generation time of a material with the earliest generation time (earliest material generation time) and the generation time of a material with the latest generation time (latest material generation time) of all materials for which each of attributes set for the plural initial groups is set, may place the calculated differences in a descending order, may select attributes down to a predetermined position in the descending order, and may set the selected one or plural attributes as the grouping attribute for the present group. Accordingly, the selected one or plural attributes may be set as the grouping attribute. Similarly, the category, which is selected for the grouping category, is not limited to the category with the largest counted total material number for each category, and may be a category with a counted total material number for each category which is equal to or greater than a threshold, or a category in a preset range from the top in a descending order of counted total material numbers for each category. The grouping key setting module 125 may calculate a difference between the generation time of a material with the earliest generation time (earliest material generation time) and the generation time of a material with the latest generation time (latest material generation time) of all materials for which each of categories set for the plural initial groups is set, may place the calculated differences in a descending order, may select categories down to a predetermined position in the descending order, and may set the selected one or plural categories as the grouping category for the present group. Accordingly, the selected one or plural categories may be set as the grouping category.

Further, the grouping key setting module 125 stores grouping key information in the material information database 106. As shown in FIGS. 5 and 6, the grouping key information includes either an attribute (grouping attribute) or a category (grouping category), which is used as a grouping key (search key), and an ID. As shown in the example of FIG. 5, the grouping key setting module 125 stores grouping key information including a grouping attribute and an ID in the material information database 106. In addition, as shown in the example of FIG. 6, the grouping key setting module 125 stores grouping key information including a grouping category and an ID in the material information database 106.

If the grouping attributes and grouping categories, which are set for those of initial groups, which neighbor in the time sequence based on generation times, agree, the re-grouping module 126 combines (re-groups) these neighboring groups into a single group. In the meantime, the re-grouping module 126 may combine neighboring groups if the grouping attributes and grouping categories, which are set for the groups, partly agree, for example, if the grouping attributes or grouping categories, which are set for the groups, agree. In addition, the re-grouping module 126 may re-group neighboring groups if the number of agreeing or associated grouping attributes, which are among the grouping attributes set for the respective groups, are greater than a preset number or ratio. Besides, the re-grouping module 126 may re-group neighboring groups if the number of agreeing or associated grouping categories, which are among the grouping attributes set for the respective groups, are greater than a preset number or ratio.

The re-grouping module 126 allocates group IDs to the groups determined by re-grouping the plural initial groups. Specifically, the re-grouping module 126 allocates group IDs to the groups which are newly set by re-grouping the plural initial groups, and to the initial groups which are not re-grouped. The re-grouping module 126 sets, with respect to each of the materials, the allocated group ID to the material information corresponding to the material. In addition, the re-grouping module 126 generates group information for each of the plural groups determined by the re-grouping. In short, the group information is generated for each group. The group information includes a group ID, a grouping attribute and a grouping category. As shown in FIG. 7, the re-grouping module 126 stores the generated group information in the material information database 106.

By the above-described structure, the materials (contents), which are input to the material input module 101, are stored in the material database 102. In addition, the material information, attribute information, grouping key information, and group information, which relate to the input materials, are stored in the material information database 106.

Next, a description is given of a method in which the respective components in the electronic apparatus generate a composite moving picture by using the constructed material database 102 and material information database 106.

A composite moving picture template is used for the generation of a composite moving picture. The composite moving picture template is a template for arranging materials in a moving picture sequence and displaying, e.g. effects on the materials. Thus, by the selection of the materials and composite moving picture template which are to be used for the generation of a composite moving picture, it is possible to generate a slide show, movie, album, collage, etc. using the materials. The composite moving template is stored in the composite moving picture template database 112.

Composite moving picture template information is indicative of information relating to the composite moving picture template in the composite moving picture template database 112. The composite moving picture template information includes, with respect to each of the composite moving picture templates, the ID, title, theme, and file name of the template, and information of materials (material number, attribute, category, etc.), which is necessary for using the template. In other words, the information which is referred to by the user at the time of selecting the composite moving picture template, and the method and condition for using the composite moving picture template are described in the composite moving picture template information for each of composite moving picture templates. The composite moving picture template information is stored in the composite moving picture template information database 111.

The grouping key/composite moving picture template selection module 107 reads grouping attributes and grouping categories from the grouping key information which is stored in the material information database 106, and presents the grouping attributes and grouping categories to the user. Specifically, a grouping key is used as a search key with which the user searches for materials. The grouping key/composite moving picture template selection module 107 displays on a display (not shown), or the like, a list comprising read grouping attributes and grouping categories. In the meantime, the grouping key/composite moving picture template selection module 107 may read either the grouping attributes or grouping categories from the grouping key information in the material information database 106, and may present the list of the read grouping attributes or grouping categories to the user.

The grouping key/composite moving picture template selection module 107 read composite moving picture template information from the composite moving picture template information database 111, and presents candidates of the composite moving picture template to the user. For example, using the read composite moving picture template information, the grouping key/composite moving picture template selection module 107 displays the list of composite moving picture templates, which can be used, on the display (not shown) or the like. The list of composite moving picture templates may display information which supports the selection of the template by the user, such as the title, theme, method of use, etc. of the composite moving picture template. In the meantime, the grouping key/composite moving picture template selection module 107 may determine the composite moving picture template (the theme of composite moving picture) based on the grouping key selected by the user.

The grouping key/composite moving picture template selection module 107 notifies the material extraction module 108 of the grouping key (grouping attribute, grouping category) and the ID of the composite moving picture template which are selected by the user. In the meantime, the grouping key and the composite moving picture template may not be selected by the user, and a predetermined grouping key and a predetermined moving picture template may be used.

The material extraction module 108 refers to the material information database 106 based on the notified grouping key, and selects materials that is used for generating the composite moving picture. Specifically, the material extraction module 108 extracts, from the group information of the material information database 106, the group information for which the grouping attribute or grouping category selected by the grouping key/composite moving picture template selection module 107 is set. Then, the material extraction module 108 extracts, from the group information of the material information database 106, the material information for which the group ID of the extracted group information is set. In the meantime, the material extraction module 108 may extract, from the group information of the material information database 106, the group information for which a grouping key agreeing with or relating to the grouping key (grouping attribute or grouping category) selected by the grouping key/composite moving picture template selection module 107 is set.

As has been described above, in the present embodiment, as the materials that are used for generating a composite moving picture, use is made not of the materials for which the selected grouping key (attribute or category) is set, but of the materials belonging to the group for which the selected grouping key (attribute or category) is set. Thereby, it is possible to extract not only the materials for which the selected attribute or category is set, but also materials relating to the materials for which the selected attribute or category is set. For example, when an attribute indicative of a certain person is selected, if the materials for which this attribute is set are extracted, only the materials, such as photos, on which the person is clearly captured, are extracted. On the other hand, if the materials belonging to the group for which this attribute is set are extracted, it is possible to extract, as well as the photos of this person, the materials relating to this person, such as photos of other persons, scenes and objects relating to this person.

In addition, the material extraction module 108 reads the composite moving picture template information by referring to the composite moving picture template information database 111 based on the notified ID of the composite moving picture template. In the meantime, by being informed of the composite moving picture template information itself by the grouping key/composite moving picture template selection module 107, the material extraction module 108 may receive the composite moving picture template information, without referring to the composite moving picture template information database 111.

The material extraction module 108 outputs the read (received) material information and composite moving picture template information to the composite moving picture generating module 109.

The composite moving picture generating module 109 generates a composite moving picture based on the input material information and composite moving picture template information. To start with, the composite moving picture generating module 109 extracts materials from the material database 102 based on the file name and file path of the input material information. Then, based on the input composite moving picture template information, the composite moving picture generating module 109 extracts the composite moving picture template from the composite moving picture template database 112. For example, based on the ID of the composite moving picture template and the file name in the composite moving picture template information, the composite moving picture generating module 109 extracts the composite moving picture template from the composite moving picture template database 112.

The composite moving picture generating module 109 generates a composite moving picture by using the extracted composite moving picture template and materials. Responding to the completion of the generation of the composite moving picture, the composite moving picture generating module 109 displays on the display, or the like, a message prompting the user to confirm whether the generated composite moving picture is to be edited or output. If the user selects the edit of the composite moving picture, the composite moving picture generating module 109 outputs the generated composite moving picture to the composite moving picture editing module 110. On the other hand, if the user selects the output of the composite moving picture, the composite moving picture generating module 109 outputs the generated composite moving picture to the composite moving picture output module 113. In the meantime, the composite moving picture generating module 109 may select a part of the extracted materials, and may generate a composite moving picture by using the selected materials. In this case, the composite moving picture generating module 109 may select materials with different attributes and categories, and may generate a composite moving picture including materials with various attributes and categories.

The composite moving picture editing module 110 provides, for instance, a tool for editing the composite moving picture input from the composite moving picture generating module 109. Using the provided tool, the user performs operations, such as addition, edit, change, and delete of materials and effects in the composite moving picture. Responding to the completion of the edit of the composite moving picture, the composite moving picture editing module 110 outputs the edited composite moving picture to the composite moving picture generating module 109.

The composite moving picture output module 113 encodes the composite moving picture input from the composite moving picture generating module 109. The composite moving picture output module 113 may store a file of the encoded composite moving picture in a predetermined storage device. In addition, the composite moving picture output module 113 may reproduce the file of the encoded composite moving picture and display it on the display or the like.

By the above-described structure, the composite moving picture is generated by using the materials accumulated in the material database 102 and the information on the materials stored in the material information database 106.

FIG. 8 is a view for explaining an example of grouping of materials and setting of grouping attributes for groups. FIG. 8 shows a plurality of materials (in this example, images) in the order of generation times. Alphabetic characters described under the materials represent the attributes of the materials (in this example, the names of persons appearing in images). Specifically, at least one of attributes A to F is set for each material corresponding to the person appearing in the material. In addition, each of the materials is classified into one initial group of groups 1 to 4 by an analysis based on generation times. Specifically, eight materials are grouped into the group 1, three materials are grouped into the group 2, four materials are grouped into the group 3, and five materials are grouped into the group 4.

For each initial group, a grouping attribute indicative of the representative attribute of the initial group is set. Referring to FIG. 9, a method of determining grouping attributes is explained.

It is assumed that for example, an attribute with a high frequency of occurrence is selected as the attribute which represents the group. The number of occurrences (the number of materials) based on an individual material analysis shown in FIG. 9 is indicative of the number of occurrences of each of the attributes set for the materials shown in FIG. 8. For example, since the attribute A is set for six images of the images (materials) shown in FIG. 8, the number of occurrences is 6. In addition, since the attribute B is set for five images of the images shown in FIG. 8, the number of occurrences is 5.

If an individual material analysis is executed on the materials shown in FIG. 8 by the above-described method, the attribute with the highest degree of attention is determined to be C. However, even if an attribute has a high value by an individual material analysis, it is possible that this attribute does not have a high sensibility worth (degree of attention) for the user who collects materials. For example, if the generation times of materials for which a certain attribute is set are local, that is, if the frequency of occurrence of materials for which this attribute is set is high only in a specific period, it is possible that this attribute is not so important for the user.

In addition, there is a case in which it is difficult to discriminate the object of attention of the user, who collects materials, by various automatic recognition processes such as face image recognition. For example, such a case may be assumed that the face of a child is captured in small size in a photo which was taken in an athletic meet, and a person, who knows in advance that the child was there, can recognize, with difficulty, the child by the child's clothes, etc. If such a material (content) is analyzed and grouped in units of a content as in the above-described individual material analysis, it is difficult to automatically discriminate the object of attention of the user or to search for the user's desired content by using the object of attention of the user as the search key (grouping key).

To cope with this problem, in the present embodiment, a plurality of materials are classified into a plurality of groups based on generation times of the materials, the attribute with a large number of occurrences (number of materials) in group analysis is selected as the grouping attribute that is the attribute representing the group. In the group analysis, the sum of numbers of materials belonging to the respective groups, into which each of the attributes set for a plurality of materials is classified, is set as the number of occurrences (number of materials) in the group analysis of this attribute. For example, the attribute A is set for materials which are classified in the group 1 shown in FIG. 8, and eight materials are grouped in the group 1. Thus, the number of occurrences of the attribute A is 8 in the group analysis. In addition, the attribute B is set for some materials which are classified in the group 1, group 3 and group 4 shown in FIG. 8, and eight materials are grouped in the group 1, four materials are grouped in the group 3 and five materials are grouped in the group 4. Thus, the number of occurrences of the attribute B in the group analysis is 8+4+5=17.

If the group analysis is executed on the materials shown in FIG. 8 by the above-described method, the attribute with the highest degree of attention is determined to be B. In each of the groups, the attribute with the largest number of occurrences in the group analysis of all the attributes set for the materials belonging to the group is set as the grouping attribute. Accordingly, of the attribute A (the number of occurrences in the group analysis=8), B (the number of occurrences=17) and C (the number of occurrences=11), the attribute B with the largest number of occurrences is set for the group 1 as the grouping attribute. In addition, of the attribute C (the number of occurrences=11) and attribute D (the number of occurrences=3), the attribute C with the larger number of occurrences is set for the group 2 as the grouping attribute.

In the group analysis, the attribute occurring over a plurality of groups can be detected as the attribute with a high degree of attention by the user. By preferentially selecting as the grouping key the attribute that is assumed to attract the user's attention over a long period of time, it is possible to execute a search which is suited to the subjective viewpoint or intention of the user who collects materials. In addition, grouping based on generation times is executed, and it is assumed that a group with a greater number of materials is a group with a greater importance, and thus the attribute that is set for the group with the large number of materials is preferentially selected as the grouping key.

Moreover, in the present embodiment, if the grouping attributes that are set for two groups neighboring in the time sequence are identical, these two groups are combined into a single group. In the example shown in FIG. 8, since the grouping attribute B is set for the group 3 and group 4 neighboring in the time sequence, the group 3 and group 4 are combined into a single group. By this combining (re-grouping), a greater number of materials can be treated as one group, and therefore the management of materials becomes easier.

By the above-described grouping (re-grouping) and the setting of the grouping key (grouping attribute, grouping category), when a search for materials is executed with use of a certain grouping key, the groups for which this grouping key is set are extracted. Thereby, the materials corresponding to this grouping key and the materials relating to this grouping key can be retrieved.

FIG. 10 is the flowchart showing an example of the procedure of a material analysis process by the material analysis module 103.

To start with, the material analysis module 103 stands by to wait for the input of materials by the material input module 101 (block B101). Responding to the input of materials by the material input module 101, the material analysis module 103 starts a subsequent process.

Next, the material analysis module 103 determines whether the process on all materials in the input materials has been completed (block B102). If the process on all materials has been completed (YES in block B102), the material analysis module 103 ends the process.

If the process on all materials has not been completed (NO in block B102), the material analysis module 103 determines whether the material information corresponding to the material (target material) to be processed is stored in the material information database 106 (block B103). If the material information corresponding to the target material is stored in the material information database 106 (YES in block B103), the material analysis module 103 returns to the process of block B102.

If the material information corresponding to the target material is not stored in the material information database 106 (NO in block B103), the material analysis module 103 analyzes the features of the target material, and determines the attributes of the target material (block B104). Then, the material analysis module 103 determines whether the attribute information corresponding to the determined attributes is stored in the material information database 106 (block B105). If the attribute information corresponding to the determined attributes is not stored in the material information database 106 (NO in block B105), the material analysis module 103 stores the attribute information corresponding to the determined attributes in the material information database 106 (block B106).

If the storage of the attribute information in block B106 is completed or if the attribute information corresponding to the determined attributes is stored in the material information database 106 (YES in block B105), the material analysis module 103 stores the material information corresponding to the target material in the material information database 106 (block B107). Then, the material analysis module 103 executes once again the process beginning from block B102.

By the above-described material analysis process, the material information and attribute information relating to the input materials are registered in the material information database 106.

FIG. 11 is the flowchart showing an example of the procedure of the attribute/category analysis process by the attribute/category analysis module 104. Using the material information and attribute information that is stored in the material information database 106 by the material analysis module 103, the attribute/category analysis module 104 updates the material information and attribute information and generates grouping key information and group information.

To start with, the category setting module 121 sets a category for each attribute information stored by the above-described material analysis process by referring to the attribute/category dictionary database 105 (block B201). Specifically, the category setting module 121 searches the attribute/category dictionary database 105 by using as the key the attribute set in the attribute information in the material information database 106, and then acquires the category corresponding to the attribute. Then, the category setting module 121 sets the category for the attribute information.

Subsequently, based on the generation time of material information, the grouping module 122 classifies the respective input materials into a plurality of initial groups (block B202). The grouping module 122 sets initial group IDs, which are allocated to these initial groups, as initial group IDs of material information corresponding to materials belonging to the respective groups. The grouping module 122 sets attributes of the materials belonging to each of the initial groups. The initial grouping process of materials will be described later with reference to FIG. 12.

Next, the material number calculation module 124 calculates the value which is obtained by multiplying the sum of numbers of materials belonging to the initial groups, for which each of the attributes of materials is set, by a predetermined coefficient that is set in advance for each attribute (block B203). The material number calculation module 124 sets the calculated value as the total material number of the attribute information corresponding to the attribute in the material information database 106. Thus, the material number calculation module 124 calculates the total material number by using the material numbers of the initial groups, with respect to each of all attributes set for the respective materials. In the meantime, the coefficient, which is allocated to each attribute in advance, is determined, for example, in accordance with the degree of importance of the attribute.

The grouping key setting module 125 registers attributes, which are in a preset range from the top in a descending order of total material numbers of attribute information, as the grouping key information (grouping attribute) in the material information database 106 (block 5204). The grouping key setting module 125 counts the total material number of attribute information with respect to each category, and registers categories, which are in a preset range from the top in a descending order of the counted values, as the grouping key information (grouping category) in the material information database 106 (block B205).

Further, the re-grouping module 126 combines two groups, which neighbor in the time sequence based on generation times and have the same grouping attribute or grouping category, into a single group (block B206). The re-grouping module 126 determines the possibility/impossibility of combination with respect to all initial groups, and combines neighboring groups having the same grouping attribute or grouping category. The re-grouping module 126 allocates group IDs to the groups determined by re-grouping. The groups determined by the re-grouping include a group which is formed by combining initial groups, and initial groups which have not been combined. The re-grouping module 126 sets the allocated group IDs for the group IDs of the material information in the material information database 106, which corresponds to the materials belonging to the respective groups.

The re-grouping module 126 registers the information of the group, which is determined by the re-grouping, as the group information in the material information database 106 (block B207). The re-grouping module 126 stores the group information, which includes the group ID, the grouping attribute of the group and the grouping category of the group, in the material information database 106. The process of re-grouping initial groups will be described later with reference to a flowchart of FIG. 13.

Figure 12:
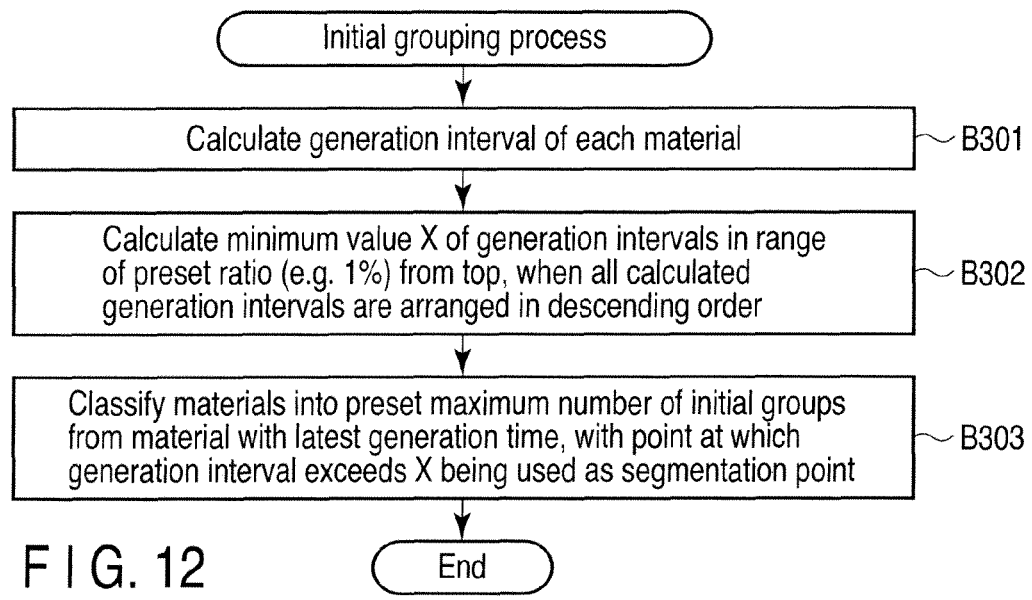
FIG. 12 is an exemplary flowchart showing an example of the procedure of an initial grouping process by the electronic apparatus of the embodiment.

FIG. 12 is the flowchart showing an example of the procedure of the initial grouping process corresponding to block B202 in FIG. 11.

To start with, the grouping module 122 calculates the generation interval which is indicative of the difference between generation times of groups neighboring in the time sequence, based on generation times of material information (block B301). Then, the grouping module 122 calculates a minimum value X of generation intervals included in a preset ratio (e.g. 1%) from the top in the descending order of the calculated generation intervals (block B302).

The grouping module 122 divides materials from the latest one of generation times by setting a point, where the generation interval exceeds the minimum value X, as a segmentation point, and classifying the materials into initial groups (block B303). In the meantime, if the number of initial groups, which are set by the division, exceeds a preset maximum number, the grouping module 122 may group materials with old generation times into a single initial group, regardless of the minimum value X. The maximum number of initial groups is determined, for example, based on the capacity of a memory which is usable for the process.

By the above-described process, the grouping module 122 can classify the input materials into a plurality of groups based on the generation times.

Figure 13:
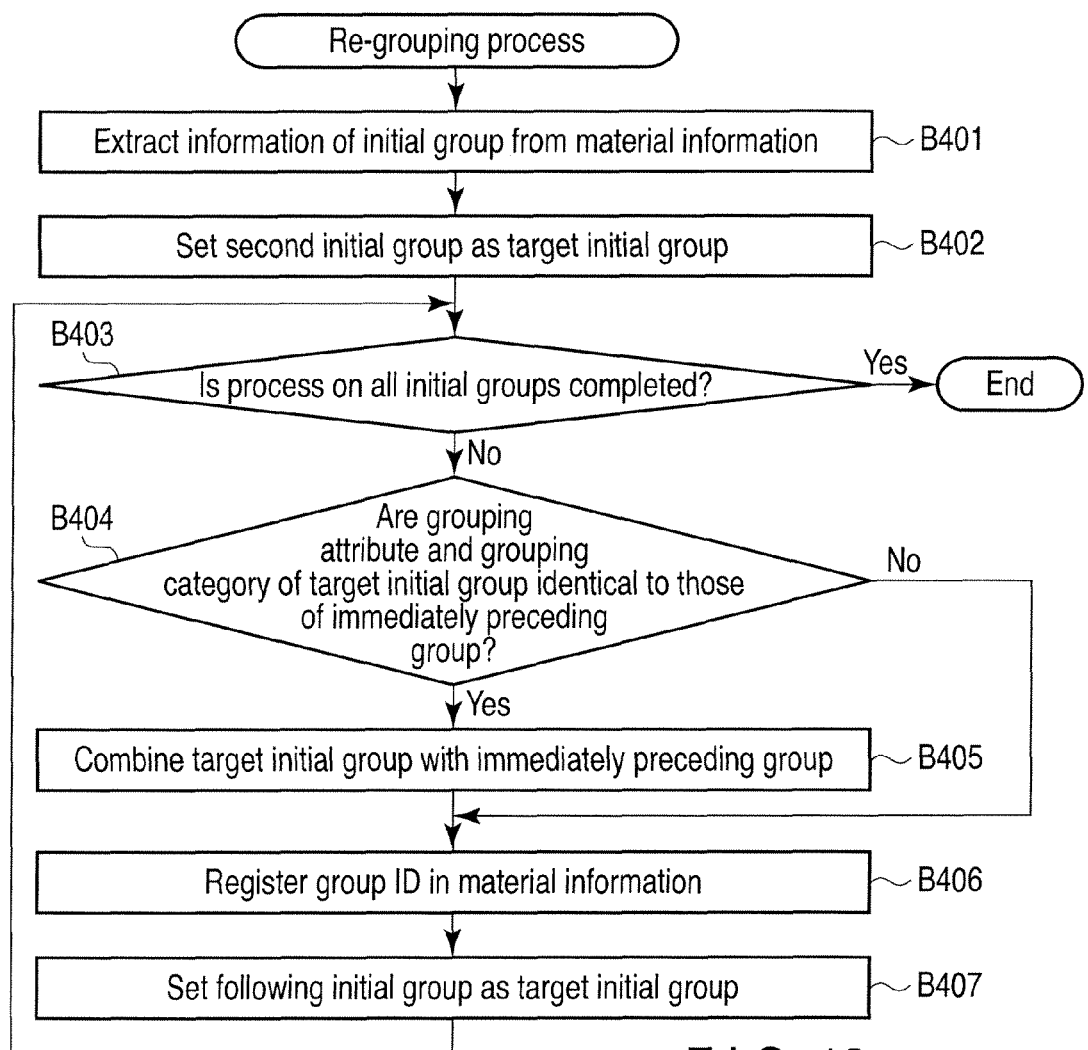
FIG. 13 is an exemplary flowchart showing an example of the procedure of a re-grouping process by the electronic apparatus of the embodiment.

FIG. 13 is the flowchart showing an example of the procedure of the re-grouping process corresponding to block B206 in FIG. 11.

To start with, the re-grouping module 126 reads information relating to initial groups from the material information in the material information database 106 (block B401). Then, the re-grouping module 126 sets, as a target initial group, the second initial group in the time sequence based on generation times (block B402). The re-grouping module 126 determines whether the process on all initial groups has been completed (block B403). If the process on all initial groups has been completed (YES in block B403), the re-grouping module 126 ends the process.

If the process on all initial groups has not been completed (NO in block B403), the re-grouping module 126 determines whether the grouping attribute and grouping category of the target initial group are identical to the grouping attribute and grouping category of the immediately preceding initial group in the time sequence (block B404). If the grouping attribute and grouping category of the target initial group are identical to the grouping attribute and grouping category of the immediately preceding initial group in the time sequence (YES in block B404), the re-grouping module 126 combines the target initial group and the immediately preceding initial group (block B405). A group ID is allocated to the group determined by the re-grouping. The re-grouping module 126 sets the allocated group ID to the material information corresponding to each of the materials belonging to the group determined by the re-grouping (block B406). Then, the re-grouping module 126 sets, as a new target initial group, an initial group which immediately follows the target initial group (block B407).

By the above-described process, the initial groups, which neighbor in the time sequence and have the same grouping attribute and grouping category which are set therefore, can be combined into one group. Thereby, since a greater number of materials can be treated as one group, the management of materials becomes easier. The re-grouping module 126 may combine neighboring groups, not only in the case where the grouping attributes and grouping categories, which are set for initial groups neighboring in the time sequence, agree, but also in the case where the grouping attributes and grouping categories, which are set for the groups, are partly agree, for example, in the case where the grouping attributes or grouping categories, which are set for the groups, agree.

FIG. 14 is the flowchart showing an example of the procedure of the composite moving picture generating process.

To start with, the grouping key/composite moving picture template selection module 107 presents to the user the candidates of the grouping attribute or grouping category, and the candidates of the composite moving picture template (block B501). The grouping key/composite moving picture template selection module 107 reads the grouping key information in the material information database 106, and displays the list of grouping attributes or the list of grouping categories on the display or the like. In addition, the grouping key/composite moving picture template selection module 107 reads the composite moving picture template information in the composite moving picture template information database 111, and displays the list of composite moving picture templates on the display or the like.

Subsequently, the grouping key/composite moving picture template selection module 107 selects the grouping attribute or grouping category, and the composite moving picture template, which are designated by the user (block B502). The grouping key/composite moving picture template selection module 107 outputs the selected grouping attribute or grouping category, and the information of the composite moving picture template, to the material extraction module 108.

The material extraction module 108 extracts from the material database 102 the materials belonging to the group for which the selected grouping attribute or grouping category is set (block B503). The material extraction module 108 outputs the extracted materials and the information of the composite moving picture temperate to the composite moving picture generating module 109.

Based on the information of the composite moving picture template, the composite moving picture generating module 109 reads the composite moving picture template from the composite moving picture template database 112. The composite moving picture generating module 109 generates a composite moving picture by using the extracted materials and the composite moving picture template (block B504). Then, the composite moving picture generating module 109 determines whether the generated composite moving picture is to be edited or not (block B505). The composite moving picture generating module 109 displays on the screen, for example, a message (dialogue, etc.) for prompting the user to make selection as to whether the generated composite moving picture is to be edited or output. The user executes an input for selecting the edit or the output of the generated composite moving picture.

If the generated composite moving picture is to be edited (YES in block B505), the composite moving picture editing module 110 edits the composite moving picture, for example, by changing materials, adding effects, etc. (block B506). Responding to the completion of the edit, the composite moving picture generating module 109 executes the determination of the block B505 once again.

If the generated composite moving picture is not to be edited (NO in block B505), the composite moving picture output module 113 encodes the composite moving picture, and generates a moving picture file (block B507). The composite moving picture output module 113 may store the generated moving picture file in a storage device. Besides, the composite moving picture output module 113 may reproduce the generated moving picture file, and output the reproduced composite moving picture on the screen or the like.

By the above-described process, the composite moving picture based on the grouping key and the composite moving picture template, which are selected by the user, is generated. Specifically, the composite moving picture including the materials corresponding to the grouping key selected by the user and the materials relating to the grouping key is generated. In short, the electronic apparatus of the present embodiment can generate video, in consideration of the relation between materials (contents).

(Modification)

Figure 15:
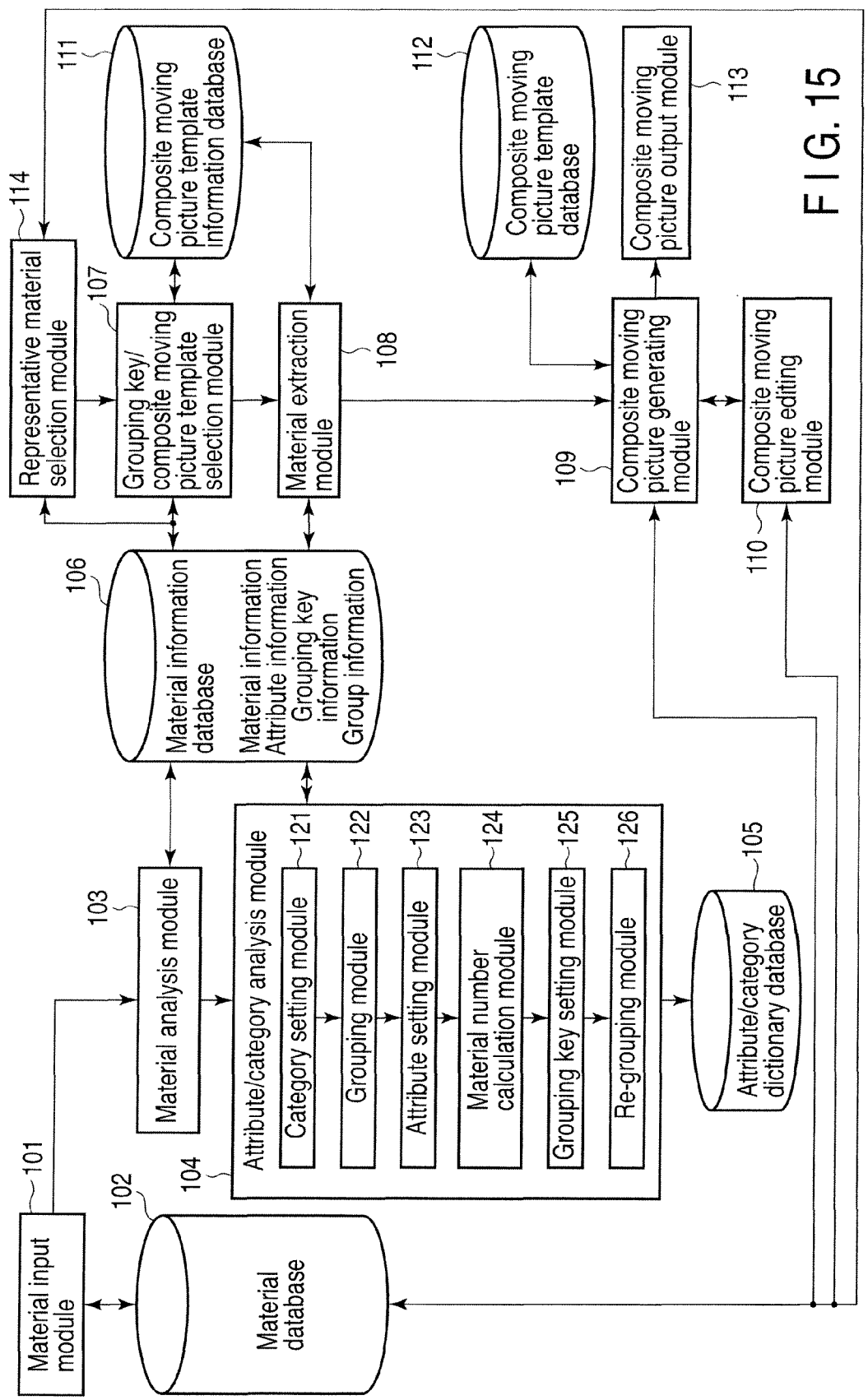
FIG. 15 is an exemplary block diagram showing a modification of the structure of the electronic apparatus of the embodiment.

FIG. 15 shows a modification of the structure of the electronic apparatus of the embodiment. This electronic apparatus further includes a representative material selection module 114.

The representative material selection module 114 reads the materials in the material database 102, and displays the candidates of the representative material for use in material extraction on the display or the like. For example, the representative material selection module 114 selects one image, for which each of attributes is set, from the material database 102, and displays the list of selected images to the user as the candidates of the representative materials. The user selects one or more materials relating to the material which is to be used for generating a composite moving picture, from the displayed candidates of the representative materials. The representative material selection module 114 uses, as a search key (grouping key), one or more materials selected by the user.

The representative material selection module 114 detects the grouping attribute and grouping category, which are set for the group to which the materials selected by the user belong. In other words, the representative material selection module 114 detects the grouping attribute and grouping category relating to the material selected by the user. The representative material selection module 114 outputs the detected grouping attribute and grouping category to the grouping key/composite moving picture template selection module 107.

The grouping key/composite moving picture template selection module 107 displays, on the display or the like, the list of detected grouping attributes and grouping categories. The user selects, from the displayed list, the grouping attribute and grouping category which are to be used for extracting materials.

Based on the selected grouping attribute and grouping category, the material extraction module 108 extracts the materials, which are to be used for generating the composite moving picture, from the material database 102.

Figure 16:
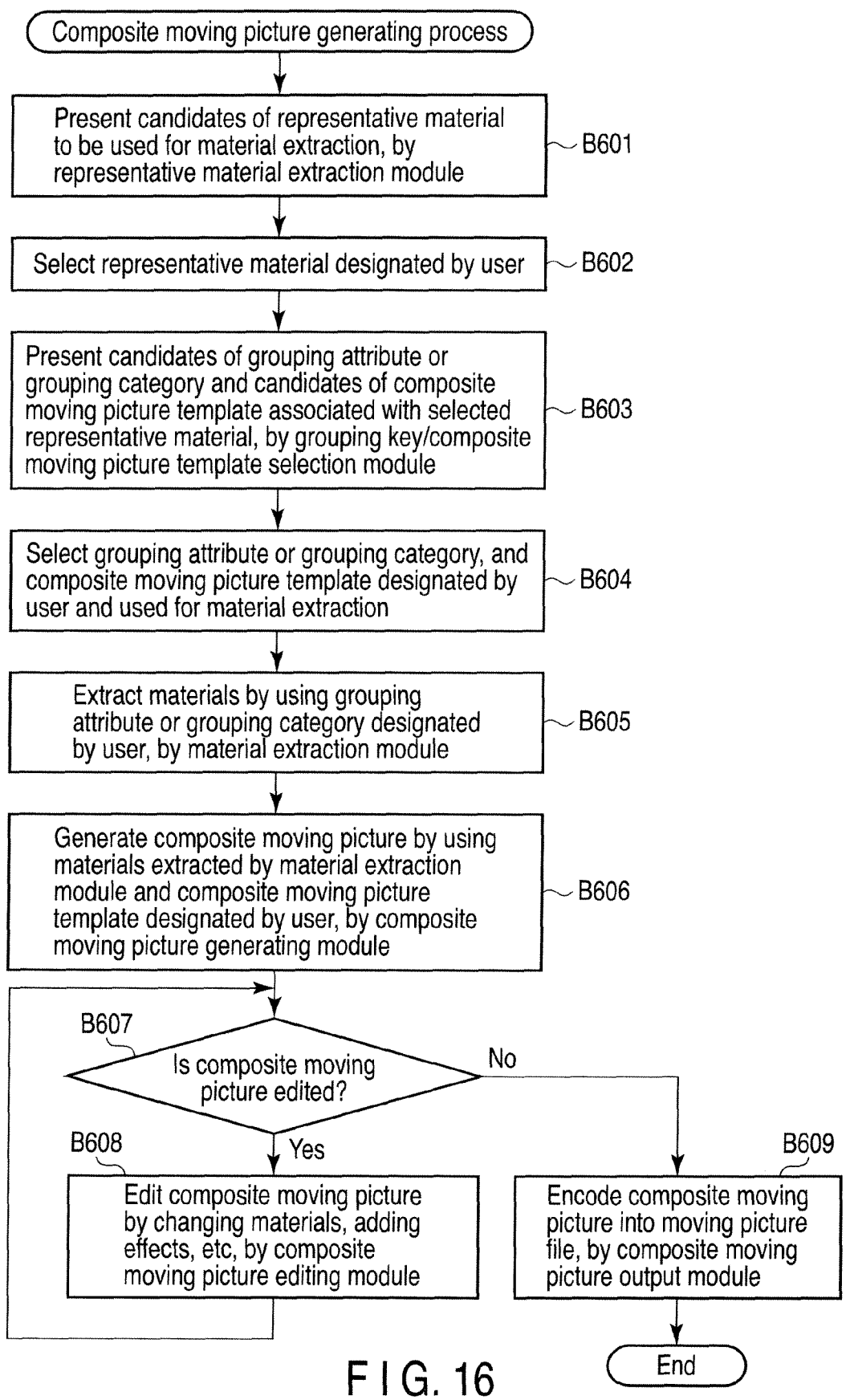
FIG. 16 is an exemplary flowchart showing an example of the procedure of a composite moving picture generating process by the electronic apparatus shown in FIG. 15.

FIG. 16 is the flowchart showing an example of the procedure of the composite moving picture generating process by the electronic apparatus according to the modification shown in FIG. 15.

To start with, the representative material selection module 114 extracts candidates of the representative material from the material database 102, and displays the candidates on the screen (block B601). The user designates, from the displayed candidates of the representative material, the candidate relating to the material which is to be used for generating the composite moving picture.

The representative material selection module 114 selects the candidate of the representative material, designated by the user (block B602). The representative material selection module 114 refers to the material information database 106 and reads the grouping attributes and grouping categories, which are set for the group to which the selected candidate (material) belongs. The representative material selection module 114 outputs the read grouping attributes and grouping categories to the grouping key/composite moving picture template selection module 107.

The grouping key/composite moving picture template selection module 107 presents to the user the candidates of the grouping attribute or grouping category, and the candidates of the composite moving picture template (block B603). Based on the grouping attributes and grouping categories input from the representative material extraction module 114, the grouping key/composite moving picture template selection module 107 displays the list of grouping attributes or the list of grouping categories on the display or the like. In addition, the grouping key/composite moving picture template selection module 107 reads the composite moving picture template information in the composite moving picture template information database 111, and displays the list of composite moving picture templates on the display or the like.

Subsequently, the grouping key/composite moving picture template selection module 107 selects the grouping attribute or grouping category, and the composite moving picture template, which are designated by the user (block B604). The grouping key/composite moving picture template selection module 107 outputs the selected grouping attribute or grouping category, and the selected information of the composite moving picture template, to the material extraction module 108.

The material extraction module 108 extracts from the material database 102 the materials belonging to the groups for which the input grouping attribute or grouping category is set (block B605). The material extraction module 108 outputs the extracted materials and the information of the composite moving picture template to the composite moving picture generating module 109.

Based on the input information of the composite moving picture template, the composite moving picture generating module 109 reads the composite moving picture template from the composite moving picture template database 112. The composite moving picture generating module 109 generates a composite moving picture by using the extracted materials and the composite moving picture template (block B606). Then, the composite moving picture generating module 109 determines whether the generated composite moving picture is to be edited or not (block B607). The composite moving picture generating module 109 displays on the screen, for example, a message (dialogue, etc.) for prompting the user to make selection as to whether the generated composite moving picture is to be edited or output. The user executes an input for selecting the edit or the output of the generated composite moving picture.

If the generated composite moving picture is to be edited (YES in block B607), the composite moving picture editing module 110 edits the composite moving picture, for example, by changing materials, adding effects, etc. (block B608). Responding to the completion of the edit of the composite moving picture, the composite moving picture generating module 109 executes the determination of the block B607 once again.

If the generated composite moving picture is not to be edited (NO in block B607), the composite moving picture output module 113 encodes the composite moving picture, and generates a moving picture file (block B609). The composite moving picture output module 113 may store the generated moving picture file in a storage device. Besides, the composite moving picture output module 113 may reproduce the generated moving picture file, and output the reproduced composite moving picture on the screen or the like.

By the above-described process, the composite moving picture based on the representative material and composite moving picture template, which are selected by the user, is generated. Specifically, the composite moving picture including the materials corresponding to the representative material selected by the user and the materials relating to this representative material is generated. In short, the electronic apparatus can generate video, in consideration of the relation between materials (contents).

As has been described above, according to the present embodiment, the generation of video, in which the relation between contents is taken into account, can be assisted. The material analysis module 103 and the attribute/category analysis module 104 execute indexing in consideration of the subjective viewpoint or intent of the user, who generated or collected materials, in accordance with the features of the materials input to the material input module 101 and the features of the groups into which the materials are grouped based on generation times. Thus, in the present embodiment, the grouping of materials and the setting of grouping keys of groups can be executed in consideration of the subjective viewpoint or intent of the user who generated or collected materials. Thereby, when a search for materials is executed by using the search key (grouping key) that is input by the user, the material extraction module 108 can search for the materials which meet the user's intention. The composite moving picture generating module 109 can generate video in consideration of the relation between materials (contents), by generating a composite moving picture with use of the materials retrieved by the search.

All the procedures of the material analysis process, attribute/category analysis process and composite moving picture generating process according to the embodiment can all be executed by software. Thus, the same advantageous effects as with the present embodiment can easily be obtained simply by installing a program, which executes the procedures of the material analysis process, attribute/category analysis process and composite moving picture generating process, into an ordinary computer through a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a grouping module configured to classify a plurality of contents, to which time information is added, into a plurality of groups based on the time information;
an attribute determination module configured to determine attributes of the plurality of contents by analyzing features of the plurality of contents;
a calculation module configured to calculate, with respect to each of the determined attributes, a sum of numbers of contents in one or more groups including a content which has the attribute;
a grouping attribute setting module configured to set, with respect to each of the plurality of groups, one or plural attributes of the attributes corresponding to the contents in the group as grouping attributes for the group, the one or plural attributes comprising an attribute with the largest calculated sum of numbers of contents, one or plural attributes up to a predetermined position in a descending order of the calculated sums, or one or plural attributes with the calculated sum which is equal to or greater than a threshold;
a group selection module configured to select, from the plurality of groups, one or more groups for which a grouping attribute matching or relating to an input search key is set; and
a video generating module configured to generate video data by using the contents in the selected groups,
wherein each of the modules is a hardware module or a combination of hardware and software.

2. The electronic apparatus of claim 1, wherein the grouping attribute setting module is configured to calculate, with respect to each of the attributes which are set for the plurality of groups, a difference between a generation time of a content which has the attribute and has the earliest generation time, and a generation time of a content which has the attribute and has the latest generation time, to arrange the calculated differences in a descending order, to select attributes up to a predetermined position in the descending order, and to set the selected one or plural attributes as the grouping attributes for the group.

3. The electronic apparatus of claim 1, wherein the group selection module is configured to display a list of the grouping attributes which are set for the plurality of groups, and to select one or more groups for which a grouping attribute selected from the list is set.

4. The electronic apparatus of claim 1, wherein the group selection module is configured to display a list of images indicative of content of the grouping attributes which are set for the plurality of groups, and to select one or more groups for which the grouping attribute corresponding to an image selected from the list is set.

5. The electronic apparatus of claim 1, wherein the grouping module is configured to classify the plurality of contents into the plurality of groups by clustering based on the time information.

6. The electronic apparatus of claim 1, further comprising a group combining module configured to combine neighboring groups, which neighbor in a time sequence based on the time information, if the number of matching or related grouping attributes between the grouping attributes, which are set for the neighboring groups, is greater than a predetermined number or ratio.

7. The electronic apparatus of claim 1, further comprising a template storing module configured to store templates for generating the video,
wherein the video generating module is configured to generate video by using the contents in the selected groups, based on a template selected from the templates.

8. The electronic apparatus of claim 1, wherein the time information comprises a time at which each of the plurality of contents is generated, a time at which each of the plurality of contents is edited, or a time at which each of the plurality of contents is imported in the electronic apparatus.

9. The electronic apparatus of claim 1, wherein the attribute comprises identification information of a person included in each of the plurality of contents; information of the number of persons detected in each of the plurality of contents; information of a degree of smile of a person in each of the plurality of contents; atmosphere information determined by the information of the number of persons detected; atmosphere information determined by the information of the degree of smile of a person; identification information of an object in each of the plurality of contents; the number of objects detected in each of the plurality of contents; image characteristic information of each of the plurality of contents; or geographic information of each of the plurality of contents.

10. The electronic apparatus of claim 1, wherein the attribute setting module is configured to determine categories corresponding to the determined attributes of the plurality of contents,
the calculation module is configured to calculate, with respect to each of the determined categories, a sum of numbers of contents in groups including a content having the category,
the grouping attribute setting module is configured to set, with respect to the plurality of groups, one or plural categories of the categories corresponding to contents in the group as grouping categories for the group, the one or plural categories comprising a category with the largest calculated sum of numbers of contents, one or plural categories up to a predetermined position in a descending order of the calculated sums, or one or plural categories with the calculated sum which is equal to or greater than a threshold and
the group selection module is configured to select, from the plurality of groups, one or more groups for which the grouping category matching an input search key is set.

11. The electronic apparatus of claim 10, wherein the group selection module is configured to display a list of the grouping categories set for the plurality of groups, and to select one or more groups for which a grouping category selected from the list is set.

12. The electronic apparatus of claim 10, wherein the group selection module is configured to display a list of images indicative of content of the grouping categories set for the plurality of groups, and to select one or more groups for which the grouping category corresponding to an image selected from the list is set.

13. An image processing method comprising:
classifying a plurality of contents, to which time information is added, into a plurality of groups based on the time information;
determining attributes of the plurality of contents by analyzing features of the plurality of contents;
calculating, with respect to each of the determined attributes, a sum of numbers of contents in one or more groups including a content which has the attribute,
setting, with respect to each of the plurality of groups, one or plural attributes of from the attributes corresponding to contents in the group as grouping attributes for the group, the one or plural attributes comprising an attribute with the largest calculated sum of numbers of contents, one or plural attributes up to a predetermined position in a descending order of the calculated sums, or one or plural attributes with the calculated sum which is equal to or greater than a threshold;
selecting, from the plurality of groups, one or more groups for which the grouping attribute matching or relating to an input search key is set; and
generating video data by using the contents in the selected groups.

14. A non-transitory computer readable medium storing a program causing a computer to execute:
classifying a plurality of contents, to which time information is added, into a plurality of groups based on the time information;
determining attributes of the plurality of contents by analyzing features of the plurality of contents;
calculating, with respect to each of the determined attributes, a sum of numbers of contents in one or more groups including a content which has the attribute,
setting, with respect to each of the plurality of groups, one or plural attributes of the attributes corresponding to the contents in the group as grouping attributes for the group, the one or plural attributes comprising an attribute with the largest calculated sum of numbers of contents, one or plural attributes up to a predetermined position in a descending order of the calculated sums, or one or plural attributes with the calculated sum which is equal to or greater than a threshold;
selecting, from the plurality of groups, one or more groups for which the grouping attribute matching or relating to an input search key is set; and
generating video data by using contents in the selected groups.

* * * * *